(12) United States Patent
Tortora et al.

(10) Patent No.: US 9,453,939 B2
(45) Date of Patent: *Sep. 27, 2016

(54) DEVICE FOR DETECTING THE POSITION OF WATCH HANDS

(71) Applicant: The Swatch Group Research and Development Ltd, Marin (CH)

(72) Inventors: Pierpasquale Tortora, Neuchatel (CH); Simon Springer, Bern (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/995,257

(22) Filed: Jan. 14, 2016

(65) Prior Publication Data
US 2016/0131797 A1 May 12, 2016

Related U.S. Application Data

(63) Continuation of application No. 14/460,582, filed on Aug. 15, 2014, now Pat. No. 9,297,644.

(30) Foreign Application Priority Data

Oct. 30, 2013 (EP) ..................... 13190872

(51) Int. Cl.
*G01J 4/00* (2006.01)
*G01V 8/22* (2006.01)
*G01B 11/14* (2006.01)
*G02B 17/00* (2006.01)
(Continued)

(52) U.S. Cl.
CPC ................. *G01V 8/22* (2013.01); *G01B 11/14* (2013.01); *G02B 17/00* (2013.01); *G04B 19/04* (2013.01);
(Continued)

(58) Field of Classification Search
CPC ..... G04C 17/00; G04B 19/042; G01B 11/14
See application file for complete search history.

(56) References Cited

U.S. PATENT DOCUMENTS 4,224,948 A * 9/1980 Cramer .............. A61B 5/02438
600/503
4,868,402 A 9/1989 Triponez
(Continued)

FOREIGN PATENT DOCUMENTS

| DE | 43 11 065 C1 | 2/1994 |
|---|---|---|
| EP | 2 626 752 A1 | 8/2013 |
| FR | 2 884 927 A1 | 10/2006 |
| GB | 2 197 968 A | 6/1988 |
| JP | 8-82683 A | 3/1996 |
| JP | 2006-275803 A | 10/2006 |
| WO | 2012/162887 A1 | 12/2012 |

OTHER PUBLICATIONS

European Search Report for EP 13 19 0872 dated Dec. 19, 2013.

*Primary Examiner* — Kara E Geisel
*Assistant Examiner* — Maurice Smith
(74) *Attorney, Agent, or Firm* — Sughrue Mion, PLLC

(57) ABSTRACT

Device for detecting the position of at least a first and a second hand of an electromechanical watch, said first and second hands moving above a dial, the detection device including a single light source emitting a light beam towards the first and second hands, and a first and a second light detection system, the light source and the first and second light detection systems being mounted on or underneath the dial, the light source and the first and second light detection systems being arranged so that, in a determined position of the first hand, the light beam emitted by the light source is reflected by the first hand towards the first detection system, and in a determined position of the second hand, the light beam emitted by the light source is reflected by the second hand towards the second detection system.

8 Claims, 2 Drawing Sheets

(51) Int. Cl.
*G04B 19/04* (2006.01)
*G04B 37/00* (2006.01)
*G04C 17/00* (2006.01)
*G04C 3/14* (2006.01)

(52) U.S. Cl.
CPC ......... *G04B 19/042* (2013.01); *G04B 37/0008* (2013.01); *G04C 3/14* (2013.01); *G04C 17/00* (2013.01)

(56) References Cited

U.S. PATENT DOCUMENTS 6,528,779 B1 * 3/2003 Franz ................. G01D 5/34715
250/214.1
2010/0296369 A1 11/2010 Tortora

* cited by examiner

DEVICE FOR DETECTING THE POSITION OF WATCH HANDS

This is a Continuation of the U.S. patent application Ser. No. 14/460,582, filed Aug. 15, 2014 which claims priority from European Patent Application No. 13190872.5 filed Oct. 30, 2013. The entire disclosures of the prior applications are considered part of the disclosure of the accompanying Continuation application, and are hereby incorporated by reference in their entirety.

FIELD OF THE INVENTION

The present invention concerns a device for detecting the position of at least one hand of an electromechanical watch. More specifically, the present invention concerns a detection device of this type which includes a light source and a light detection system.

BACKGROUND OF THE INVENTION

There are known electromechanical watches having hands wherein the hour hand and the minute hand of the current time display are driven either by the same electric motor, or by distinct electric motors which move the wheels of the watch mechanism forward in steps. In both cases, it may happen that motor steps are lost because of shocks experienced by the watch, the presence of electromagnetic fields or other external disturbances. As a result, although the internal clock of the watch provides a correct indication of the current time, the hour and minute hands provide an incorrect current time indication, because the motors have jumped several steps under the effect of the external disturbance applied to the watch. It is therefore necessary to resynchronise the position of the hour and minute hands, either at the demand of a software application, or at the user's demand.

A known solution for detecting the position of a timepiece mechanism wheel for an electromechanical watch having hands consists in arranging, on either side of the wheel plate, a light source emitting a light beam and a light detection system. The light source and the light detection system are arranged facing each other and a hole is arranged in the wheel plate on the path of the light source and of the light detection system. When the hole reaches the vicinity of the light source, the light beam passes through the hole and falls onto the light detection system, which allows a precise indication to be provided as to the position of the wheel.

This type of device for detecting the position of a timepiece mechanism wheel for an electromechanical watch having hands has several drawbacks. The first of these drawbacks lies in the fact that the light source and the light detection system are arranged in a stepped manner in an essentially vertical direction, which makes the detection device bulky and requires recesses to be provided towards the top and bottom. The second problem becomes critical in the case where it is sought to detect the position of two coaxial wheels as is the case of an hour wheel and a minute wheel. Indeed, in that case, it is, for example, necessary to arrange the two light detection systems between the two wheels and to place the light sources respectively above and below the assembly of the two coaxial wheels. This type of arrangement not only requires a lot of space but also requires two of the detection device elements, for example the two light detection systems, to be placed between the wheels, which makes it practically impossible to automate the manufacture of these timepiece movements.

Another solution for detecting the position of a timepiece mechanism wheel for an electromechanical watch having hands is disclosed in EP Patent Application No 1493935. More specifically, this document discloses a device for detecting the position of at least a first wheel of a timepiece mechanism for an electromechanical watch having hands, the first wheel extending in a horizontal plane. The detection device includes at least one light source emitting a light beam and at least one light detection system, said detection device also including a first light reflector element, the light source and the light detection system being arranged so that, in a determined position of the first wheel of the timepiece mechanism, the light beam emitted by the light source is reflected by the first reflector element towards the light detection system.

This solution advantageously allows detection of the position of two wheels of the timepiece mechanism by means of a single light source and a single reflector element. However, the light source and the light detection system on one hand, and the reflector element on the other hand are arranged on either side of the wheel whose position is required to be detected, which increases the thickness of the timepiece mechanism and makes it more difficult to integrate in a watch case.

Yet another solution for detecting the position of a timepiece mechanism wheel for an electromechanical watch having hands is disclosed by EP Patent Application No 2626752 in the name of the Applicant. More specifically, this document discloses a device for detecting the position of at least a first wheel of a timepiece mechanism for an electromechanical watch having hands, said first wheel extending in one plane. The detection device includes at least one light source emitting a light beam and at least one light detection system. A first light reflector element projects from one of the top or bottom surfaces of the first wheel of the timepiece mechanism, the light source and the light detection system being arranged so that, in a determined position of the first wheel of the timepiece mechanism, the light beam emitted by the light source is reflected by the first reflector element towards the light detection system.

This other known solution provides a detection device wherein the light beam emitted by the light source is reflected by a reflector element which stands on the surface of a timepiece mechanism wheel towards the light detection system. Rather than being arranged on either side of the wheel, the light source and the detection system may be arranged at the periphery of the wheel, which results in a considerable space saving. However, the device has to be integrated in the timepiece mechanism, which makes the timepiece mechanism more complex and thus more expensive to manufacture.

Yet another solution for detecting the position of an electromechanical watch hand is disclosed by JP Patent Application No 2006-275803. In this document, the hand position detection device includes two light sources and two light detection systems. A first pair formed of a light source and a light detection system detects the position of a first hand, while a second pair formed of a light source and a light detection system detects the position of a second hand. The two pairs of light sources and light detection systems are arranged underneath the watch dial which is therefore translucent.

The watch hand position detection device briefly described above detects the position of a watch hand by means of components mounted underneath the surface of the watch dial. This therefore avoids the need to assemble the detection device within the volume of the timepiece mechanism. Further, since the components of the detection system are mounted underneath the surface of the watch dial, it is hardly unnecessary or unnecessary to increase the height of the hand relative to the surface of the dial, so that the detection device according to the invention is compact. However, a notable drawback of this type of detection device lies in the fact that it requires two light sources and two detection systems in order to be able to detect the position of two distinct hands. This type of detection device is thus expensive both as regards the components required and as regards assembly time.

SUMMARY OF THE INVENTION

It is an object of the present invention to overcome the aforementioned drawbacks in addition to others by providing a device for detecting the position of at least one hand of an electromechanical watch which is, in particular, less complex.

The present invention therefore concerns a device for detecting the position of at least a first and a second hands of an electromechanical watch, said first and second hands moving above a dial, the detection device including a single light source emitting a light beam towards the first and second hands, and a first and a second light detection systems, the light source and the first and second light detection systems being mounted on or underneath the dial, the light source and the first and second light detection systems being arranged so that, in a determined position of the first hand, the light beam emitted by the light source is reflected by the first hand towards the first detection system, and in a determined position of the second hand, the light beam emitted by the light source is reflected by the second hand towards the second detection system.

As a result of these features, the present invention provides a hand position detection device for an electromechanical timepiece permitting the position of two distinct hands to be detected by means of a single light source. This type of detection device is thus less expensive both as regards the components required and as regards assembly time and the space required.

According to a complementary feature of the invention, the first hand and the second hand each include a surface which reflects the light beam towards the light detection system.

Like the first hand, which has a first reflective surface, the second hand has a second surface which is arranged to reflect the light beam emitted by the light source in a directional manner towards the second detection system. As a result of this feature, it is possible, using a single light source, to detect the position of two distinct hands in a differentiated manner.

According to another feature of the invention, the light source and the light detection system are aligned on a straight line which passes through the centre of the watch dial.

According to yet another feature of the invention, the light source is arranged between the first and second light detection systems.

According to yet another feature of the invention, the light source emits a light beam vertically upwards.

According to yet another feature of the invention, the light source is a vertical cavity surface emission laser or VCSEL.

According to yet another feature of the invention, in the case where the light source and the light detection system are mounted underneath the watch dial, either the dial is transparent to the wavelength of the light emitted by the light source, or the light source and the light detection system are disposed facing corresponding apertures arranged in the dial.

BRIEF DESCRIPTION OF THE DRAWINGS

Other features and advantages of the present invention will appear more clearly from the following detailed description of an example embodiment of the detection device according to the invention, this example being given solely by way of non-limiting illustration with reference to the annexed drawings, in which.

DETAILED DESCRIPTION OF THE INVENTION

The present invention proceeds from the general inventive idea which consists in mounting a single light source and a first and a second light detection systems on or underneath the surface of a dial. At least a first and a second hand which move above the dial are capable of reflecting towards the corresponding light detection system a light beam which is emitted by the light source. The light detection device according to the invention, which is formed of the single light source and the first and second light detection systems, is thus compact. It is therefore possible to detect the position of a first and a second hand simply by means of a single light source and a first and a second light detection systems solely. Indeed, the first and second hands are each provided with a surface which selectively reflects the light beam towards the first light detection system, respectively the second light detection system. It is thus possible to detect the position of a plurality of hands without having to multiply the light sources.

Figure 1:
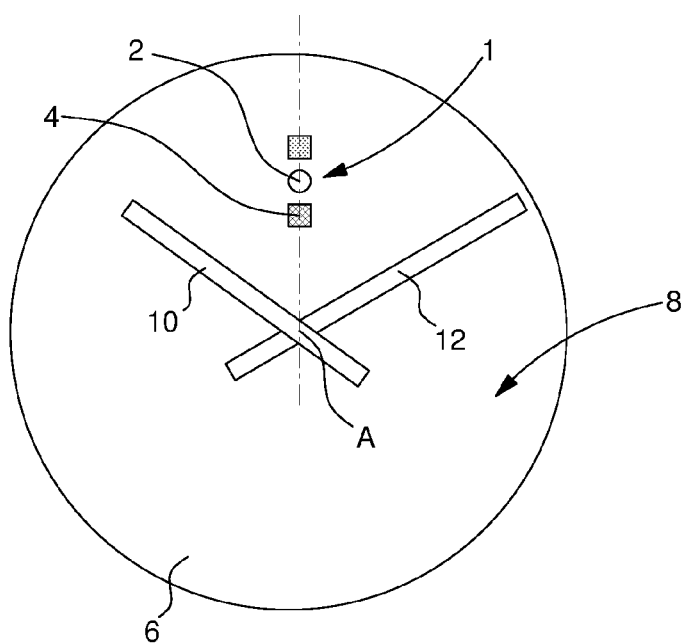
FIG. 1 is a plan view of a watch dial according to the invention, on which a light source and a first and a second light detection systems are mounted.

FIG. 1 is a plan view of a watch dial according to the invention, on which a light source and a first and a second light detection systems are mounted. Designated as a whole by the general reference numeral 1, detection device 1 according to the invention includes a light source 2, and a first light detection system 4 mounted on a top surface 6 of a dial 8. A first hand 10, for example an hour hand, and a second hand 12, for example a minute hand, move above dial 8. Preferably, light source 2 and first light detection system 4 are aligned on a straight line which passes through the centre A of dial 8.

According to a variant embodiment of the invention, in the case where light source 2 and/or light detection system 4 are mounted underneath watch dial 8, either dial 8 is transparent to the wavelength of the light emitted by light source 2, or light source 2 and/or light detection system 4 are disposed facing corresponding apertures arranged in dial 8.

Figure 2A:
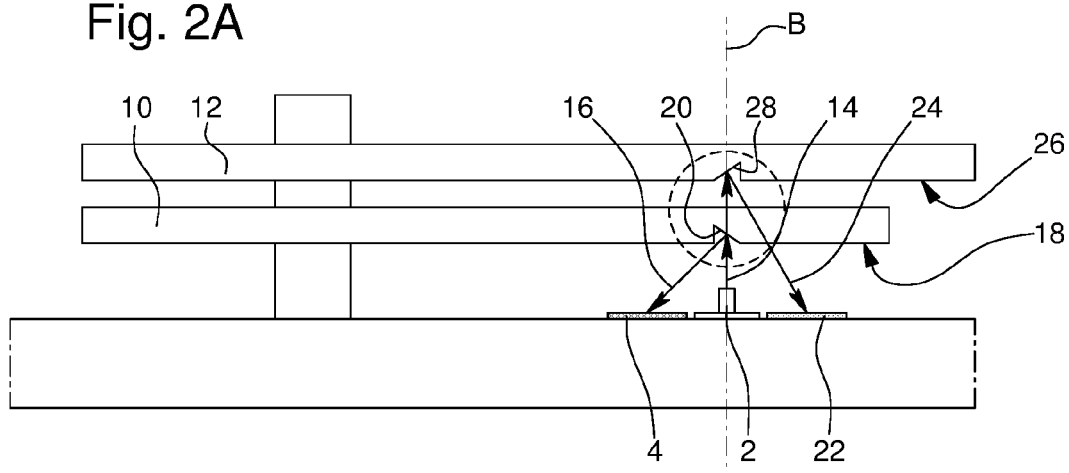
FIG. 2A is a cross-sectional and profile view of the watch dial of FIG. 1, showing a first hand and a second hand which move above the dial, the light source emitting upwards a light beam which is reflected towards the first light detection system by a first surface of the first hand, and towards the second light detection system by a second surface of the second hand.
Figure 2B:
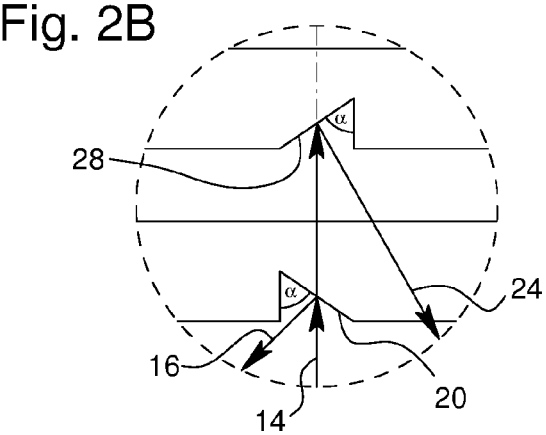
FIG. 2B is a larger scale view of the area surrounded by a circle in FIG. 2A, and FIGS. 3A and 3B illustrate a variant embodiment of the invention in which the bottom faces of the hour and minute hands are provided with a first, respectively a second diffraction network which diffract the light beam emitted by the light source at different angles.

As can be seen upon examining FIGS. 2A and 2B, light source 2 emits a light beam 14 upwards towards the hour and minute hands 10 and 12. By way of non-limiting example, light source 2 is a vertical cavity surface emission laser or VCSEL.

Light source 2 and first light detection system 4 are arranged so that, in a determined position of hour hand 10, the light beam 14 emitted by light source 2 is reflected by hour hand 10 in a light beam 16 towards the first light detection system 4.

For this purpose, hour hand 10 is provided in a bottom surface 18 with a first reflective surface 20 inclined towards dial 8 which selectively reflects light beam 16 towards first detection system 4.

According to the preferred embodiment of the invention, detection device 1 includes a second light detection system 22 mounted on or underneath dial 8, light source 2 being arranged between the first and second light detection systems 4, 22, and the three components being aligned. In a determined position of minute hand 12, light beam 14 emitted by light source 2 is reflected by minute hand 12 in a light beam 24 towards second light detection system 22.

For this purpose, minute hand 12 is provided in a bottom face 26 with a second reflective surface 28 inclined towards dial 8 at a different inclination from the inclination of the first reflective surface 20 which selectively reflects light beam 24 towards the second light detection system 22.

It will be clear from the foregoing that the orientation of reflective surface 20 of hour hand 10 must be different from the orientation of reflective surface 28 of minute hand 12 so that a given reflective surface only reflects light towards one of the light detection systems, to the exclusion of the other detection system. For this reason, reflective surfaces 20, 28 are symmetrical relative to a vertical axis of symmetry B and are inclined at an angle a which increases from the top downwards.

As a result of this feature, it is possible, using a single light source, to detect the position of two or more hands. It will also be understood that, although in the example illustrated in FIG. 2A, light source 2 is arranged between the first and second light detection systems 4, 22, this arrangement is not mandatory. Indeed, it is the inclination of the first and second reflective surfaces 20 and 28 which determines the location on surface 6 of dial 8 where light beam 14 falls after reflection, and thus the position of light detection systems 4, 22.

When the presence of hour hand 10 is detected, the position of hour hand 10 is known with precision and it is known how many steps an electric drive motor has to take to place hour hand 10 in the correct position on watch dial 8. Likewise, the position of minute hand 12 is detected with precision and it is known how many steps an electric drive motor has to take for minute hand 12 to reach the desired position on watch dial 8.

Thus, a single light source 2 and two light detection systems 4 are sufficient to detect in a sequential manner the position of the two respective hands 10 and 12. The synchronisation of the two hands 10, 12 must occur in a sequential manner, i.e. one hand after the other. For further details on the method for synchronising the hands, reference may be made, for example, to the Proceedings of the International Congress of Chronometry 2007, pages 107 to 109, published by the Swiss Chronometry Society. The optical detection device according to the invention may be calibrated in a similar manner to the LC oscillator described in the aforecited Proceedings whose frequency varies as it approaches a metallic target. This is why, when the watch is activated or the battery is changed, the control circuit will require each hand fitted with the optical detection system according to the invention to complete one revolution in order to determine the position of the hand, using the point of maximum light reflection by the hand concerned. One revolution of the dial requires, for example, 180 motor steps. After each motor step, a measurement is performed of the light intensity detected by the light detection system. When the hand passes opposite the light detection system, the light intensity reflected by the hand abruptly increases. This abrupt increase in measured light intensity represents detection of the position of the hand. The position corresponding to the abrupt increase in detected light is then stored in the memory. After each measurement, the value of light intensity is digitised and transmitted to a control circuit. When the watch control system or the user requests synchronisation, the control circuit, starting from the position corresponding to the abrupt increase in reflected light intensity, makes N motor steps in the anticlockwise direction without performing a measurement in order to position itself before the position in which the hand faces the light detection system. The control system then performs 2N motor steps with a measurement at each step. The 2N values thereby obtained are stored in the memory. The control circuit then calculates the position of the hand, compares it to the value supplied by its internal clock and, if necessary, corrects it by imparting corrective pulses.

It goes without saying that this invention is not limited to the embodiment that has just been described and that various simple alterations and variants can be envisaged by those skilled in the art without departing from the scope of the invention as defined by the annexed claims. In particular, it will be understood that, preferably, the light source and the light detection system or systems are mounted on the same top or bottom side of the dial. It is however possible to envisage varying the distribution of the light source and light detection systems, by arranging some on the top side of the dial and others on the bottom side of the dial.

Figure 3A:
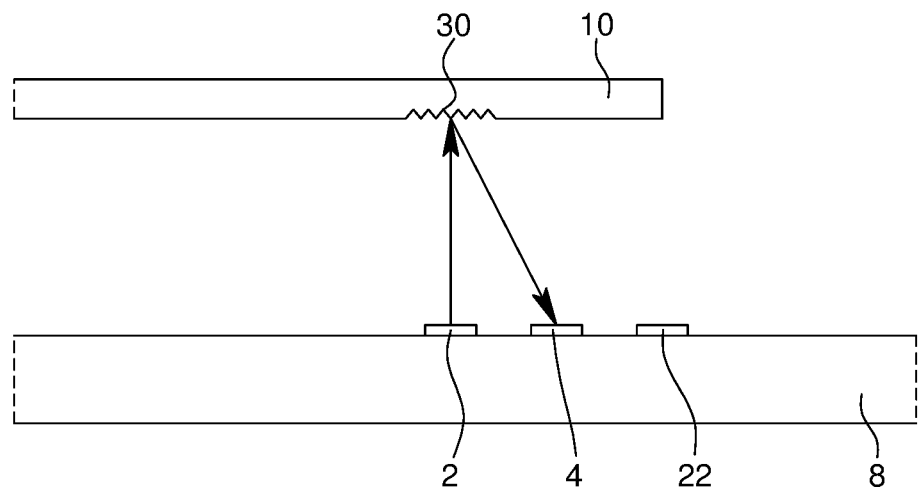
Figure 3B:
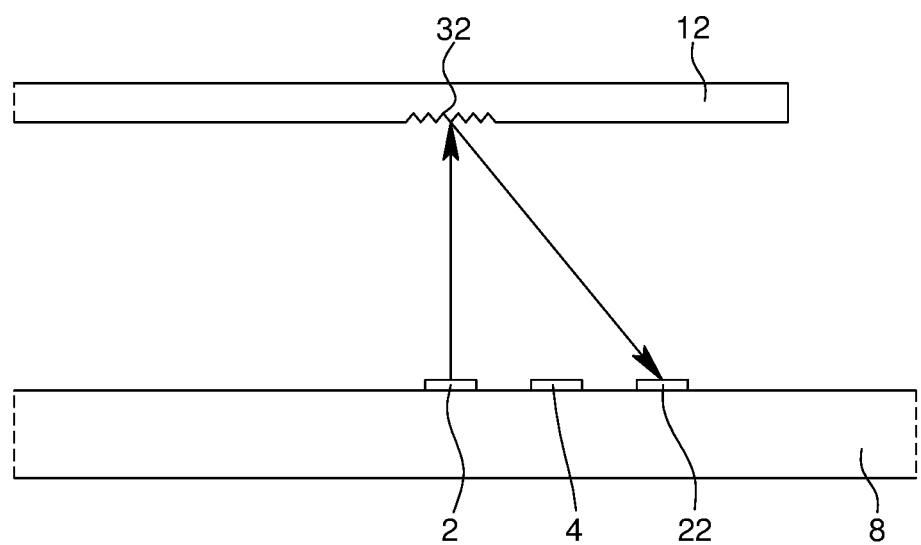

According to a variant embodiment illustrated in FIGS. 3A and 3B, the bottom faces 18, 26 of hour hand 10 and minute hand 12 are provided with a first, respectively a second diffraction network 30 and 32. Since the periodicity of these diffraction networks 30, 32 is different, the light beam 14 emitted by light source 2 is diffracted at different angles and therefore falls on first light detection system 4, respectively second light detection system 22. The advantage of this embodiment is that it can be implemented with hands having standard thickness.

What is claimed is:

1. A device for detecting the position of at least a first hand and a second hand of an electromechanical watch, wherein the first hand and the second hand move above a dial, wherein the detection device comprises:
    a single light source emitting a light beam towards the first hand and the second hand, and
    a first light detection system and a second light detection system,
    wherein the light source and the first and second light detection systems are mounted on or underneath the dial,
    wherein the light source and the first and second light detection systems are arranged so that, in a determined position of the first hand, the light beam emitted by the light source is reflected by the first hand towards the first detection system, and in a determined position of the second hand, the light beam emitted by the light source is reflected by the second hand towards the second detection system.

2. The detection device according to claim 1, wherein the first hand and the second hand each includes a reflective surface which reflects the light beam towards the first light detection system and the second light detection system, respectively.

3. The detection device according to claim 2, wherein the reflective surfaces are arranged in a bottom face of the corresponding hand.

4. The detection device according to claim 1, wherein the light source and the first and second light detection systems are aligned on a straight line which passes through a centre of the watch dial.

5. The detection device according to claim 4, wherein the light source is arranged between the first and second light detection systems.

6. The detection device according to claim 1, wherein the light source emits a light beam vertically upwards.

7. The detection device according to claim 6, wherein the light source is a vertical cavity surface emission laser.

8. The detection device according to claim 1, wherein in the case where the light source and the light detection systems are mounted underneath the watch dial, either the dial is transparent to the wavelength of the light emitted by the light source, or the light source and the light detection systems are disposed facing corresponding apertures arranged in the dial.

* * * * *

UNITED STATES PATENT AND TRADEMARK OFFICE
CERTIFICATE OF CORRECTION

PATENT NO. : 9,453,939 B2
APPLICATION NO. : 14/995257
DATED : September 27, 2016
INVENTOR(S) : Pierpasquale Tortora and Simon Springer It is certified that error appears in the above-identified patent and that said Letters Patent is hereby corrected as shown below:

On the Title Page

Item (30) should read:

(30) Foreign Application Priority Data
October 30, 2013 (EP)   13190872.5

In the Specification

Column 5, Line 37 delete "a" and insert -- α --

Signed and Sealed this
Fourteenth Day of February, 2017

Michelle K. Lee
*Director of the United States Patent and Trademark Office*